United States Patent [19]

Lohmeijer

[11] Patent Number: 4,493,915
[45] Date of Patent: Jan. 15, 1985

[54] LIGHT STABLE THERMOPLASTIC POLYPHENYLENE ETHER RESIN COMPOSITIONS COMPRISING PURPLE ANTHRAPYRIDONE DYE OR YELLOW QUINOPHTALONE DYE

[75] Inventor: Johannes H. G. M. Lohmeijer, Hoogerheide, Netherlands

[73] Assignee: General Electric Company, Selkirk, N.Y.

[21] Appl. No.: 546,136

[22] Filed: Oct. 27, 1983

[30] Foreign Application Priority Data

Oct. 29, 1982 [NL] Netherlands ............... 8204181

[51] Int. Cl.³ .................. C08K 5/34; C08L 71/04
[52] U.S. Cl. ............................. 524/87; 524/508; 524/611
[58] Field of Search .............. 524/87, 89, 611, 508

[56] References Cited

U.S. PATENT DOCUMENTS 3,846,369 11/1974 Whyte ........................... 524/724
4,226,951 10/1980 White ........................... 525/92
4,293,478 10/1981 Sugio et al. ........................... 525/132

OTHER PUBLICATIONS

Derwent Abst. 26610 K/11 (J58021466) 2-1983 Pentel KK.
Derwent Abst. 79789 E/38 (J57130046) 8-1982 Canon KK.
Derwent Abst. 79787 E/38 (J57130044) 8-82 Canon KK.
Derwent Abst. 14988 E/08 (J57010149) 1-1981 Canon KK.
Chem. Abst. 87-7310f (1977) Yoshikawa et al.

*Primary Examiner*—Herbert J. Lilling

[57] ABSTRACT

A thermoplastic composition having improved resistance to discoloration upon exposure to light, comprising:

a thermoplastic resin base polymer; and
at least one dye capable of bleaching upon exposure to light in an amount effective for compensating for a change in color of said thermoplastic resin base polymer upon exposure to said light.

6 Claims, No Drawings

LIGHT STABLE THERMOPLASTIC POLYPHENYLENE ETHER RESIN COMPOSITIONS COMPRISING PURPLE ANTHRAPYRIDONE DYE OR YELLOW QUINOPHTALONE DYE

This application claims priority from an application first filed in the Netherlands, Ser. No. 8,204,181 filed Oct. 29, 1982.

FIELD OF THE INVENTION

The invention relates to a polymer mixture which maintains its color upon exposure to light.

BACKGROUND OF THE INVENTION

Many polymers have the unpleasant property of losing their color upon exposure to light. Such polymers include polyphenylene ethers, aromatic polyesters such as polybutylene terephthalate, polyethylene terephthalate and styrene-containing (co)polymers, for example, polystyrene, rubber-modified "high-impact" polystyrene, styrene-acrylonitrile (SAN) copolymers, acrylonitrile-butadiene-styrene (ABS) polymers, especially such styrene-containing (co)polymers which have been made self-extinguishing by the addition of aromatic bromine compounds, as well as polymer mixtures comprising one or more of the said polymers.

The present invention relates to a polymer mixture which comprises a polyphenylene ether polymer, optionally a styrene polymer and one or more dyes. Such mixtures and their mode of preparation are to be found in numerous patent publications, for example, the U.S. Pat. Nos. 3,306,874; 3,306,875; 3,257,357; and 3,257,358. The use of styrene polymers in such mixtures is described more in particular in the U.S. Pat. Nos. 3,383,435 and 3,663,661.

These mixtures can be colored by incorporating dyes therein. Generally, when articles formed from these mixtures are exposed to light, discoloring occurs. This discoloring is probably associated with a yellowing of the polyphenylene ether polymer used. The present invention provides a solution to this problem.

DESCRIPTION OF THE INVENTION

The polymer mixture according to the invention is characterized in that it comprises one or more dyes which compensate for the change in color of the polymeric constituents upon exposure to light in that said dyes bleach upon exposure to light. Good results are obtained when the polymer mixture comprises a purple anthrapyridone dye and/or a yellow quinophtalone dye with the following structural backbone:

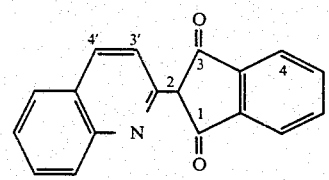

which may carry substituents, with the exception of such yellow quinophtalone dyes having a hydroxyl substituent in position 3' of the structural backbone and/or a purple anthrapyridone dye. Quinophtalone dyes are known per se; a list of suitable quinophtalone dyes can be found in Helvetia Chimica Acta, vol. 52, fasc. 5 (1969) p. 1259-1273 enumerating some quinophtalone dyes of which the yellow ones without hydroxyl substituent in position 3' are suitable for the purpose of this invention. The quinophtalone dyes with a hydroxyl group in position 3' are not suitable for the purpose of this invention since they are too stable upon exposure to light. The use of quinophtalone dyes with a 3'-hydroxylsubstituent in polymers is known from French Patent Specification No. 2,252,372.

The yellow quinophtalone dye is preferably used in a quantity from 0.001 to 0.5% by weight: the purple anthrapyridone dye is used in a quantity from 0.001 to 0.2% by weight. Good results have been obtained with Solvent Yellow 33 (Color Index No. 47,000 Amaplast Yellow Y of the American Color & Chemical Co., a quinophtalone dye without any substituents on the quinophtalone backbone), Solvent Yellow 138 (Paliotol Yellow 1090 of BASF) and with Solvent Red 52 (Color Index No. 68,210 Macrolex Red 5B of Messrs. Bayer Ag, a quinophtalone dye substituted with halogen atoms and one or more aromatic groups and without an hydroxyl group in position 3').

The invention is based on the recognition of the fact that the yellowing of the polyphenylene ether polymer can be compensated in color by a complete or partial decomposition of the selected dyes upon exposure to light. The best results are obtained by using a yellow quinophtalone dye together with a purple anthrapyridone dye. As a result of this combination a color compensation occurs over a wavelength of approximately 400-600 nanometers, in which range a visible discoloring of the polyphenylene ether polymer occurs upon exposure to light.

The preferably used polyphenylene ether polymers have the following formula:

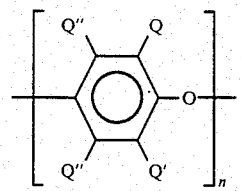

wherein Q is a monovalent substituent, for example, a hydrogen atom, a hydrocarbon radical, a hydrohalogenic radical having at least two carbon atoms between the halogen atom and the phenyl nucleus, an alkoxy radical or a halogen alkoxy radical having at least tow carbon atoms between the halogen atom and the phenyl nucleus, Q' and Q" may be the same as Q or in Addition represent a halogen atom, wherein Q, Q' and Q" may not comprise a tertiary alpha carbon atom and wherein n is an integer of 50 or more. In addition to a polyphenylene ether polymer the polymer mixture according to the invention preferably also comprises a styrene polymer. The styrene polymer may be mixed physically with the polyphenylene ether polymer. The polymer mixture may also comprise a graft-copolymer product, for example, as may be formed upon co-extrusion of the polyphenylene ether polymer and the styrene polymer at elevated temperature (230°-320° C.).

The styrene polymer is preferably a polymer in which at least 25% by weight of the units of the polymer may consist of a vinylaromatic compound of the formula:

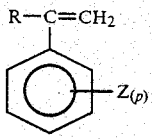

wherein R is a hydrogen atom, a lower alkyl group (having, for example, 1-6 carbon atoms) or a halogen atom; Z is a vinyl group, a hydrogen atom, a chlorine atom or a lower alkyl group and p=0 or an integer from 1-5. The expression "styrene polymer" as defined above and as used in the claims of the present patent application therefore comprises, by way of example, homopolymers, for example, polystyrene, polychlorostyrene and polybromostyrene, rubber-modified polystyrenes, for example, the commercially available high-impact polystyrene polymers and also the styrene-comprising copolymers, for example, styrene-acrylonitrile copolymers (SAN), styrene butadiene copolymers, styrene acrylonitrile butadiene terpolymers (ABS), poly-$\alpha$-methyl styrene, copolymers of ethylvinylbenzene and divinylbenzene and the like. Styrene homopolymers and rubber-modified high-impact polystyrene are preferred.

The styrene polymer may be present in any feasible quantity. Weight ratios of the polyphenylene ether polymer to styrene polymer varying between 1:99 and 99:1 are used. The weight ratio is preferably chosen between 1:5 and 5:1, and even more preferably a weight ratio of approximately 1:1 is used.

The invention also provides for the addition of one or more special dyes to other polymers which discolor upon being exposed to light. Examples of such polymers have already been mentioned hereinbefore.

A dye which may be added to the polymer mixture according to the invention is a yellow quinophtalone dye and/or a purple anthrapyridone dye. A mixture of these dyes is preferably used. These dyes have the property of bleaching upon exposure to light, i.e. after exposure they reflect more in the blue and green spectral range. Therefore they compensate for the yellowing of the polymeric constituents in the polymer mixture, which results in a decrease of the reflection in the blue and green ranges of the visible light spectrum.

In addition, the polymer mixture may comprise other dyes to obtain the desired color. There term "dyes" also includes pigments.

The polymer mixture according to the invention can be prepared according to usual techniques. The further processing to articles is also carried out according to conventional methods. It has been found that the said yellow quinophtalone dyes and purple anthrapyridone dyes can readily be mixed in the polymer mixture and are not attacked and maintain their color at extrusion temperatures up to 300° C. The polymer mixture according to the invention can easily be prepared by dry-mixing powdered or granular starting products, succeeded by mixing in the viscous state, for example, on a warm roller or in an extruder. After cooling, the resulting product is reduced to grains or pellets. In addition to the above-mentioned constituents the polymer mixture according to the invention may include any conventional additives for such mixtures. Examples of such additives are flame-retarding agents, antidrip agents, softeners, antioxidation agents, stabilizers, reinforcing agents, fillers, dyes, auxiliary substances to improve the processibility, means to increase the impact strength etc., each in amounts conventional for the stated purpose.

The invention will be described in greater detail with reference to the following specific examples.

EXAMPLE I

Two polymer mixtures were prepared with the same green color; mixture A without the dyes according to the invention, and Example I with a mixture of two dyes according to the invention. The mixtures were prepared by dry mixing of the following constituents:

| Constituents | Mixture (parts by weight) A | Ex. I |
|---|---|---|
| poly (2,6 dimethyl-1,4-phenylene ether) | 35 | 35 |
| rubber-modified high impact polystyrene (Styron XP 5554.02 Dow) | 65 | 65 |
| SBS-rubber (Cariflex TR 1102, Shell) | 5 | 5 |
| Solvent Yellow 33, C.I. 47000 Amaplast Yellow Y. American Color & Chemical Corporation | — | 0.025 |
| Solvent Red 52, C.I. 68210 Macrolex Red 5B, Bayer | — | 0.013 |
| Chromium oxide green | 1.1 | 2.0 |
| Cadmium sulphide yellow | 0.45 | — |
| Iron oxide brown | — | 0.08 |
| Ultramarine blue | 0.25 | 0.05 |
| Titanium oxide white | — | 1.0 |
| Carbon Black | 0.028 | 0.019 |

The pigments in themselves are well stable upon heating and exposure to light. The total quantity of pigments is approximately equal in both mixtures. The mutual ratio of the pigments differs to obtain an equal green color for both mixtures.

The mixtures were passed through an extruder (approximately 290° C.). The extrudates were processed to pellets. The pellets were processed to test plates having a dimension of 50×50×3 mm. The test plates were placed in a Suntest apparatus (Original Hanau Quarzlampen GmbH) and exposed to light for 300 hours with filtered xenon radiation (daylight D65). The discoloring as compared with non-exposed test plates was calculated according to CIELAB (DIN 6174) from reflection spectra obtained by means of a Zeiss RFC3 spectrophotometer.

The test plates prepared from mixture A showed a strong discoloring (delta $E_{ab*}=8.3$); the test plates prepared from mixture I according to the invention showed a much smaller discoloring (delta $E_{ab*}=2.1$).

EXAMPLE II

Two polymer mixtures were prepared with the same beige color; mixture B without the dyes according to the invention and Example II with a mixture of two dyes according to the invention.

| Constituents | Mixture (parts by weight) A | Ex. I |
|---|---|---|
| Poly (2,6-dimethyl-1,4-phenylene ether) | 35 | 35 |
| rubber-modified high-impact polystyrene (Styron XP5554.02 Dow) | 65 | 65 |
| Pigment Yellow 138, Paliotol Gelb 1090, BASF | — | 0.091 |
| Solvent Red 52, C.I. 68210 Macrolex Red 5B, Bayer | — | 0.0038 |

| Constituents | Mixture (parts by weight) | |
|---|---|---|
| | A | Ex. I |
| Titanium oxide white | 4.3 | 5.0 |
| Cadmium sulphide yellow | 1.2 | 0.85 |
| Cadmium sulphoselenide brown | 2.0 | 1.8 |
| Carbon Black | 0.016 | 0.021 |

Test plates of the mixtures B and II were manufactured according to the same method as described for Example I. The plates were exposed to light for 200 hours only. The test plates of the polymer mixture II in accordance with the invention showed a small discoloring (delta $E_{ab*}=1.8$), those of mixture B showed a stronger discoloring (delta $E_{ab*}=4.6$).

EXAMPLE III

Two mixtures were prepared from the same components as indicated in Example II. Moreover, 5 parts by weight of triphenyl phosphate were added to each of the mixtures (a flame retarding agent). Test plates were manufactured from the resulting mixtures and exposed to light for 200 hours. The test plate without the dyes in accordance with the invention discolored (delta $E_{ab*}=4.4$) more than the test plate with the dyes according to the invention (delta $E_{ab*}=1.9$).

I claim:

1. A thermoplastic polyphenylene ether resin composition having improved resistance to discoloration upon exposure to light, comprising:
a polyphenylene ether base polymer; and
at least one dye capable of bleaching upon exposure to light in an amount effective for compensating for a change in color of said polyphenylene ether base polymer upon exposure to said light wherein said compensating dye is selected from the group consisting of purple anthrapyridone dye or yellow quinophtalone dye.

2. A composition as in claim 1 wherein said polyphenylene ether base polymer is a polyphenylene ether modified alkenyl aromatic polymer.

3. A composition as in claim 1 wherein said quinphtalone dye has the structural backbone

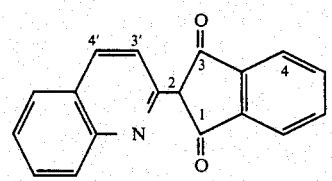

which may carry substituents, with the exception of such yellow quinophtalone dyes having a hydroxy substituent in position 3' of the structural backbone.

4. A composition as in claim 1 wherein said quinophtalone dye is present in an amount of 0.001 to 0.5% by weight of the composition.

5. A composition as in claim 1 wherein said anthrapyridone dye is present in an amount of 0.001 to 0.2% by weight of the composition.

6. An article formed from the thermoplastic composition of claim 1.

* * * * *